United States Patent
Jung et al.

(10) Patent No.: US 8,208,916 B2
(45) Date of Patent: Jun. 26, 2012

(54) APPARATUS AND METHOD OF PREDICTING RADIO WAVE ENVIRONMENT

(75) Inventors: Myoung-Won Jung, Daejeon (KR); Nam Ho Jeong, Chungcheongnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 121 days.

(21) Appl. No.: 12/882,772

(22) Filed: Sep. 15, 2010

(65) Prior Publication Data
US 2011/0143682 A1 Jun. 16, 2011

(30) Foreign Application Priority Data

Dec. 16, 2009 (KR) .......................... 10-2009-0125437
Dec. 16, 2009 (KR) .......................... 10-2009-0125448
Feb. 4, 2010 (KR) .......................... 10-2010-0010281

(51) Int. Cl.
*H04W 24/00* (2009.01)
(52) U.S. Cl. ...................... 455/424; 455/423; 455/67.11; 455/67.16
(58) Field of Classification Search .................. 455/423, 455/424, 67.11, 67.13, 67.14, 67.15, 67.16; 702/35–36, 40, 94–95, 155, 157–159, 181; 324/96, 97
See application file for complete search history.

(56) References Cited

U.S. PATENT DOCUMENTS

| | | | | |
|---|---|---|---|---|
| 5,831,874 A | * | 11/1998 | Boone et al. | 703/2 |
| 6,161,018 A | * | 12/2000 | Reed et al. | 455/456.1 |
| 6,487,417 B1 | * | 11/2002 | Rossoni et al. | 455/67.16 |
| 7,844,264 B2 | * | 11/2010 | Watanabe | 455/423 |
| 7,962,102 B2 | * | 6/2011 | Corral et al. | 455/67.16 |
| 2002/0094809 A1 | * | 7/2002 | Watanabe et al. | 455/423 |
| 2002/0107663 A1 | * | 8/2002 | Furukawa et al. | 702/181 |
| 2004/0116113 A1 | * | 6/2004 | Watanabe | 455/423 |
| 2004/0259554 A1 | * | 12/2004 | Rappaport et al. | 455/446 |
| 2005/0179591 A1 | * | 8/2005 | Bertoni et al. | 342/453 |
| 2007/0093212 A1 | * | 4/2007 | Sugahara | 455/67.16 |
| 2008/0132174 A1 | * | 6/2008 | Corral et al. | 455/67.16 |
| 2008/0161005 A1 | * | 7/2008 | Sato et al. | 455/446 |

OTHER PUBLICATIONS

N. Noori et al., "A New Double Counting Cancellation Technique for Three-Dimensional Ray Launching Method", 2006 IEEE, pp. 2185-2188.
Zhengqing Yun et al., "Development of a New Shooting-and-Bouncing Ray (SBR) Tracing Method That Avoids Ray Double Counting", 2001 IEEE, pp. 464-467.

* cited by examiner

*Primary Examiner* — Tuan A Tran
(74) *Attorney, Agent, or Firm* — Rabin & Berdo, P.C.

(57) ABSTRACT

Provided is an apparatus and method of predicting a radio-wave environment. The apparatus may include an arrival recognition unit to determine whether a ray emitted from a transmission unit of the ray tracing scheme arrives within a reception radius, a position determination unit to determine an arrival position where the ray arrives within the reception radius, and a processing unit to correct the reception radius by differently applying a size of the ray according to the arrival position.

12 Claims, 9 Drawing Sheets

APPARATUS AND METHOD OF PREDICTING RADIO WAVE ENVIRONMENT

CROSS-REFERENCE TO RELATED APPLICATION(S)

This application claims the benefit of Korean Patent Application Nos. 10-2009-0125437, filed on Dec. 16, 2009, 10-2009-0125448, Dec. 16, 2009 and 10-2010-0010281, filed Feb. 4, 2010, in the Korean Intellectual Property Office, the disclosures of which are incorporated herein by reference.

BACKGROUND

1. Field of the Invention

The present invention relates to an apparatus and method of predicting a radio wave environment, and more particularly, to an apparatus and method of predicting a radio wave environment using a ray tracing scheme.

2. Description of the Related Art

As a method of predicting and modeling a radio wave environment, a statistical approach method and a theoretical approach method which are based on extensive measurement results may be used. A ray tracing scheme as an example of the theoretical approach method may predict a radio wave environment with relatively accuracy in comparison with other radio-wave prediction methods.

In a radio wave environment of a city, there exist many factors that may need to be considered, such as arrangement, height, materials, and directions of buildings, and the like and thus, as a method for predicting a radio wave environment, a ray launching scheme may be widely used. The ray launching scheme is performed such that an intensity of a received radio wave may be calculated based on a reflection process, a diffraction process, and the like which a radio wave is subjected to, until a ray emitted in a predetermined angle, spaced apart from a transmission point, arrives at a reception point.

A reception method of the ray launching scheme among conventional ray tracing methods may be performed using a reception radius (for example, a reception sphere which is three dimensional (3D), and a reception circle which is two dimensional (2D)). In the reception method of the ray launching scheme, infinite rays emitted from the transmission point may be replaced with finite rays, and a path running until each of the finite rays is sequentially emitted, and then arrives the reception point may be traced. Accordingly, in the reception method of the ray launching scheme, a path loss or a delay distribution may be calculated by summing powers of rays received in the reception point based on the traced to multiple paths. In this instance, when a transmitted signal enters within the reception radius, the signal may be considered as arriving at the reception point.

In an initial concept for the reception radius, the reception radius may be calculated as the same value as '1' based on an assumption that an overall area of the reception radius is 1, however, the calculation of the reception radius does not refer to the reception radius varying based on a distance change between the transmission point and the reception point thus, may cause an occurrence of double counting and a dead zone.

Accordingly, in a radio-wave environment prediction performed using the ray tracing scheme, there is a demand for a method that may improve the reception radius by referring to the distance change between the transmission point and the reception point while preventing the double counting and the dead zone from occurring, and also requiring a relatively fewer calculations.

SUMMARY

An aspect of the present invention provides a method of predicting a radio wave environment, which may apply a size of a ray to correspond to a distance change between a reception point and a transmission point, so that an error due to a double counting or a dead zone may be prevented from occurring, when predicting the radio-wave environment using a ray tracing scheme.

Another aspect of the present invention provides a method of predicting a radio wave environment, which may differently apply the size of the ray depending on an arrival position where the ray arrives within the reception circle when a structure is present within the reception circle on a Line Of Sight (LOS) between the transmission point and the reception point, thereby preventing errors of a ray tracing scheme from occurring.

According to an aspect of the present invention, there is provided an apparatus of predicting a radio wave environment using a ray tracing scheme, the apparatus including: an arrival recognition unit to determine whether a ray emitted from a transmission unit of the ray tracing scheme arrives within a reception radius; a position determination unit to determine an arrival position where the ray arrives within the reception radius; and a processing unit to correct the reception radius by differently applying a size of the ray according to the arrival position.

According to another aspect of the present invention, there is provided a method of predicting a radio wave environment using a ray tracing scheme, the method including: recognizing whether a ray emitted from a transmission unit of the ray tracing scheme arrives within a reception radius; determining an arrival position where the ray arrives within the reception radius; and correcting the reception radius by differently applying a size of the ray according to the arrival position.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
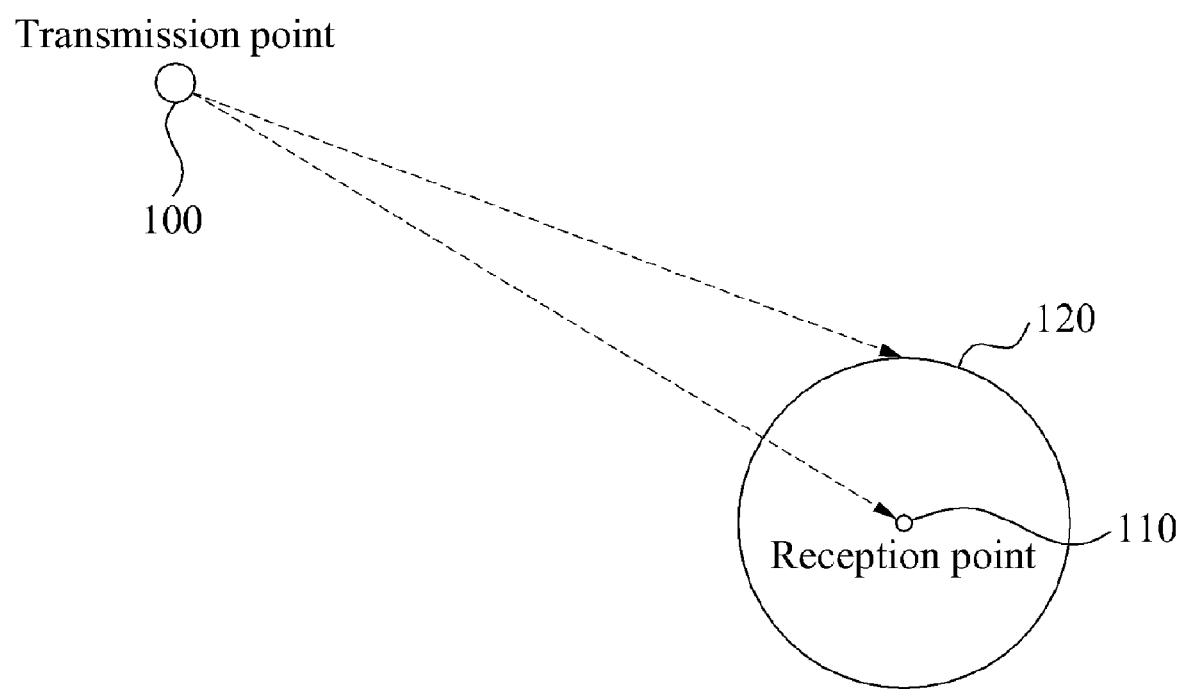
FIG. 1 is a diagram used for describing a method of determining a reception radius in a ray launching method according to a conventional art.

Reference will now be made in detail to embodiments of the present invention, examples of which are illustrated in the accompanying drawings, wherein like reference numerals refer to the like elements throughout. Embodiments are described below to explain the present invention by referring to the figures.

Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

FIG. 1 is a diagram used for describing a method of determining a reception radius in a ray launching method according to a conventional art.

Referring to FIG. 1, a three-dimensional (3D) ray tracing method may start a ray tracing using a ray launching method. In the ray launching method, a maximum number (N) of rays emitted from an imaginary spherical body may be set, and each of the rays ($1 \leq n \leq N$, N being a natural number) may be sequentially emitted to a predetermined space in a transmission unit. In the ray launching method, an arbitrary reception point may be selected, the reception radius may be determined with respect to the reception point, and a direction of each of rays (n) may be changed through a reflection process or diffraction process which each of rays is subjected to while each of the rays entering peripheral topographic features, so that each of rays may finally pass through the reception radius (or the reception point) to determine whether the ray is received.

Specifically, whether the ray is received may be determined based on whether a ray emitted from a transmission point 100 passes through the reception radius 120 (or a reception point 110). Also, when a plurality of the rays emitted from the transmission point 100 exists, the reception radius may be determined based on an angle of each of rays, spaced apart from the transmission point 100, and a line where each of the rays advances, that is, an advancing distance.

Figure 2:
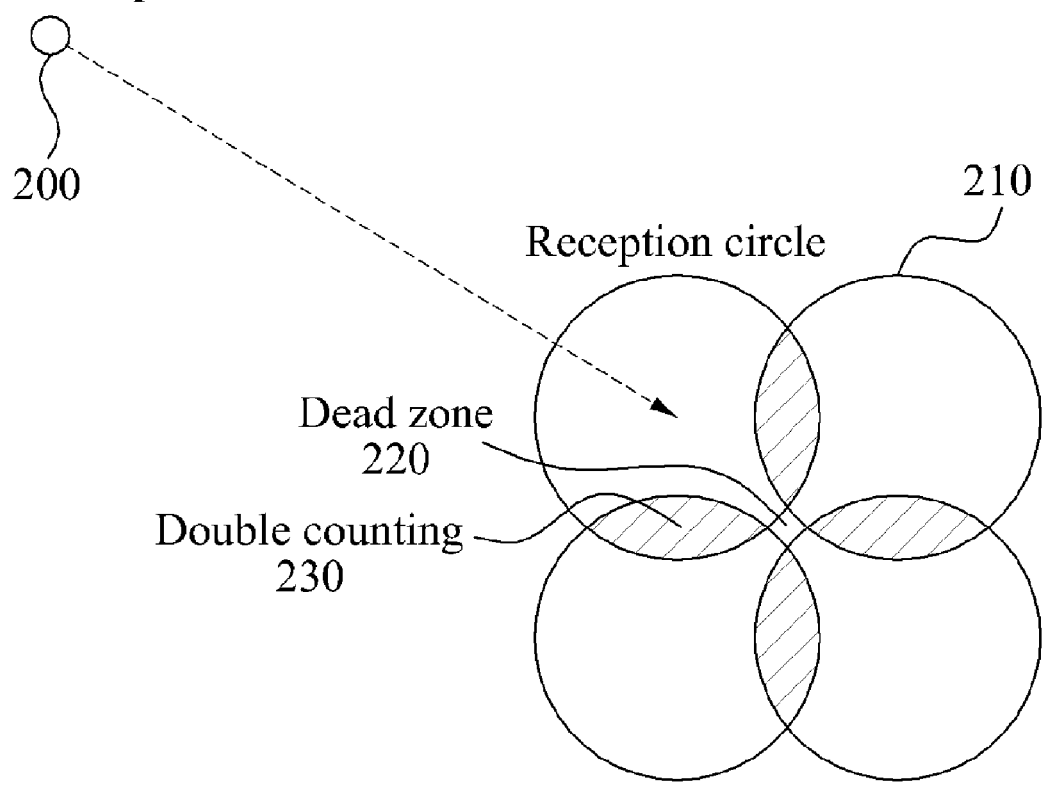
FIG. 2 is a diagram used for describing a problem generated due to a conventional method of determining a reception circle.

FIG. 2 is a diagram used for describing a problem generated due to a conventional method of determining a reception circle.

When using the conventional method of determining the reception radius, problems such as a double counting 230 and a dead zone 220 may be incurred due to a distance difference between the transmission point and the reception point. The problems may be generated since each size of all rays entering within the reception radius is processed as '1'. In this instance, the size of the ray may be defined as being a parameter used for calculating a pass loss and a delay distribution.

Specifically, the dead zone 220 increases along with a reduction in a size of the reception radius, and the double counting 230 increases along with an increase in the size of the reception radius, which may result in an increase of an error when analyzing radio-wave environment characteristics.

That is, the ray emitted from the transmission point 200 may be directly subjected to a transmission process, a reflection process, a diffraction process, and the like while the ray advances, so that the same signal may arrive, several times, within the reception radius 210. In this instance, the same signal needs to be computed once, however, may be computed at least a second time, which is referred to as the double counting 230. Accordingly, when the reception radius is relatively large, a probability where the same signal arrives several times may increase, which may cause an increase in an occurrence probability of the double counting 230. Conversely, when the reception radius is relatively small, an area where the signal arrives may be reduced, which may cause an increase in the dead zone 220.

As for the double counting, assuming that a ray arriving within the reception radius is '1', a value normalized as '1' may be applied based on an amount of path loss obtained by multiplying a reflection coefficient ($\alpha$) and a diffraction coefficient ($\beta$) by '1', respectively. In this instance, the size of the ray, that is, the normalized value is applied as '1' regardless of an arrival position that the ray arrives within the reception radius to thereby be computed several times, so that an error of the double counting may significantly increase. Accordingly, the size of the ray may be differently applied depending on the arrival position where the ray arrives within the reception radius, thereby reducing the error of the double counting, which will be further described below.

Figure 3:
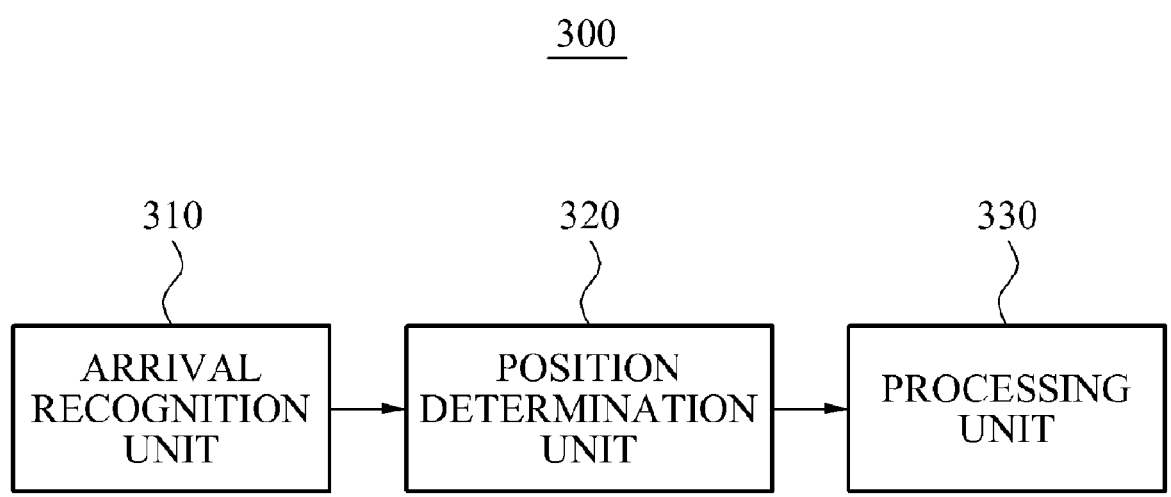
FIG. 3 is a block diagram illustrating an apparatus of predicting a radio-wave environment according to an embodiment.

FIG. 3 is a block diagram illustrating an apparatus 300 of predicting a radio-wave environment according to an embodiment.

The apparatus 300 according to an embodiment includes an arrival recognition unit 310, a position determination unit 320, and a processing unit 330.

The arrival recognition unit 310 may recognize whether a ray emitted from a transmission unit of the ray tracing scheme passes through a reception radius of a transmission point, that is, whether the ray arrives within the reception circle.

Also, the position determination unit 320 may determine an arrival position where the ray arrives within the reception radius. For example, a signal transmission in a process where the ray tracing method is performed may be a expressed as a consecutive vector, and when a ray arrives within the reception radius, the arrival position may be determined using a vector of a radio-wave advancing direction and a normal vector of the reception radius, which is the same manner as the manner where a contact point is found based on a relation between a linear vector and a normal vector when the linear vector passes through a specific plane.

Also, the processing unit 330 may differently apply the size of the ray using the arrival position of the ray. When a distance between the arrival position of the ray and a center of the reception circle is smaller than or equal to a predetermined value, which is referred to as a 'first reception area', the size of the ray may be applied as another predetermined value, and when the distance between the arrival position and the center of the reception circle is greater than the predetermined value, which is referred to as a 'second reception area, the size of the ray may be applied by adjusting the size of the ray in a reception circle contrast ratio of the second reception area.

In this instance, when the second reception area is divided into a plurality of areas, the same size of the ray that is in inverse proportion to the distance between the arrival position and the center of the reception circle may be applied to areas having the same reception circle. That is, when the distance between the arrival position and the center of the reception circle is greater than the predetermined value, the size of the ray may be reduced in inverse proportion to an increase in the distance and thus, an error generated in the double counting may be reduced.

Figure 4:
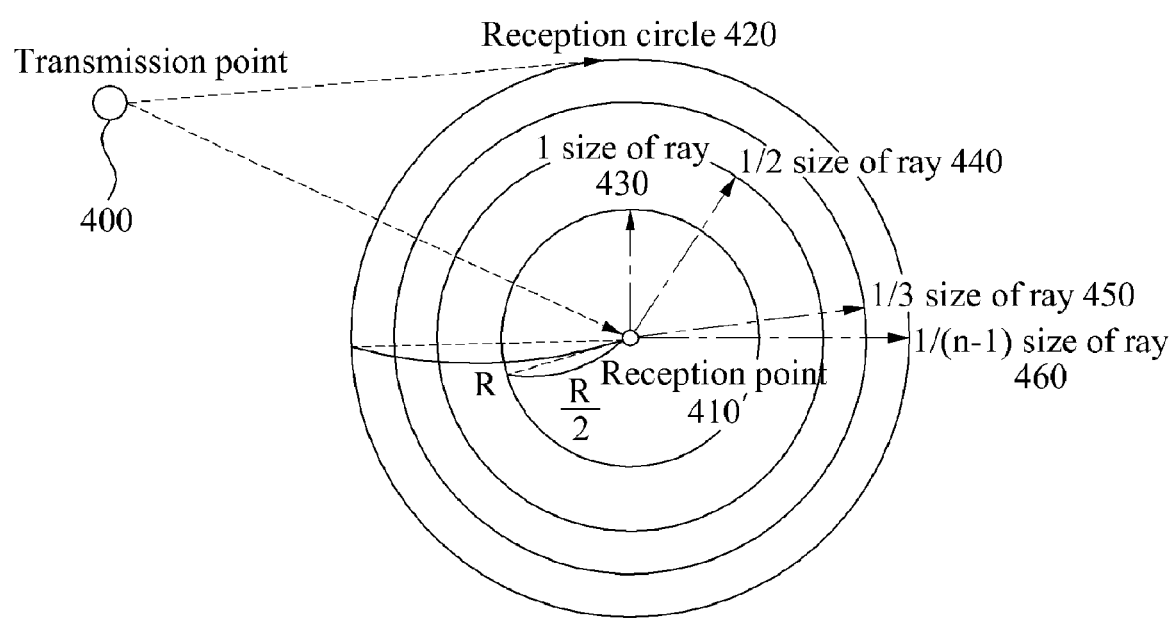
FIG. 4 is a diagram illustrating an example where rays are differently applied in a processing unit of the apparatus of FIG.

FIG. 4 is a diagram illustrating an example where rays are differently applied in a to processing unit of the apparatus of FIG. 3.

Referring to FIG. 4, rays emitted from a transmission point 400 may arrive a reception circle 420 or a reception point 410 through each path of the rays. A size of the ray may be differently applied depending on an arrival position of the ray, and for example, a predetermined value may be ½ a reception circle.

The reason ½ the reception circle is the predetermined value is because, in order to cover overall directions of 360 degrees with respect to a reception point without creating a dead zone when some of a plurality of reception radiuses are overlapped, the respective reception radiuses need to be overlapped by ½ the reception circle. For example, in a case of two reception radiuses, a maximum overlapped area is ½ the reception radius, so that a signal of each of areas excluding the overlapped area may be '1' as a maximum.

However, when referring to other variables, a value different from a value corresponding to ½ the reception circle may be the predetermined value for reducing the error generated in the double counting.

When the distance between the arrival position and the center of the reception circle is smaller than or equal to ½ the reception circle, that is, in a case of the first reception area, the size of the ray may be applied as '1' size of the ray 430, and when the distance is greater than ½ the reception circle, that is, in a case of the second reception area, the size of the ray may be applied as '½' a size of the ray 440, '⅓' a size of the ray 450, and '1/(n−1)' a size of the ray 460, respectively, depending on the distance between the arrival position and the center of the reception circle after dividing an area greater than ½ the reception circle into a plurality of regions. Specifically, in a case where the reception circle is R, when the distance between the arrival position and the center of the reception circle is smaller than or equal to R/2, the size of the ray may be applied as '1', and when the distance is greater than R/2, the applied size of the ray may be reduced along with an increase in the distance between the arrival position and the center of the reception radius for each of the divided to areas.

Figure 5:
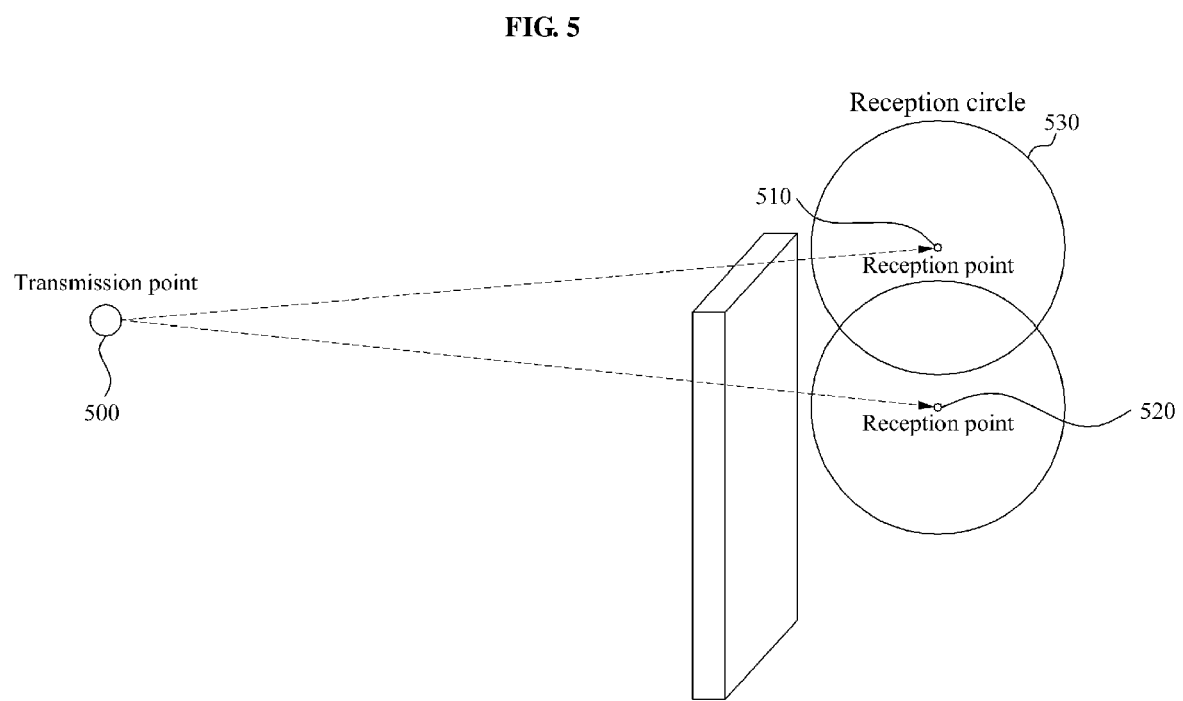
FIG. 5 is a diagram illustrating a problem generated when a structure is present within a reception circle on a Line of Sight (LOS) between a transmission point and a reception point in a ray launching scheme.

FIG. 5 is a diagram illustrating a problem generated when a structure is present within a reception circle on a Line of Sight (LOS) between a transmission point 500 and a reception point 510 or 520 in a ray launching scheme.

Referring to FIG. 5, in a conventional method of determining a reception circle, when a tracing line of a ray passes through a corner of a structure, a corresponding signal may be processed as a signal that fails to be received, or processed as a signal received while including a signal entering the reception point 510 or 520 starting from the transmission point 500 and a reflected wave generated by a structure. In this instance, a size of the received signal may be significantly reduced or increased to be less than or greater than a size of a signal that can be received, which may be a problem generated since sizes of all rays entering the reception circle are processed as '1'.

Specifically, rays emitted from the transmission point 500 may be subjected to a transmission process, a reflection process, a diffraction process, and the like due to a presence of a structure, and arrive at a reception circle 530 or the reception point 510 or 520. Also, rays with the same signal may be subjected to the reflection process, the diffraction process, and the like, and arrive at the reception circle 530 several times.

When the reception point exists within the structure, a separate computation scheme of a signal may be used. However, when the structure exists in the vicinity of the structure, that is, exists within the reception circle, all signals entering the reception circle of the reception point may be computed, and a plurality of reflected waves generated around a wall surface of the structure may exist to be evenly distributed within the reception circle. Accordingly, a double counting may be generated to cause a reduction in an accuracy of the computation. In this regards, the size of the ray may be different depending on the arrival position of the ray within the reception circle, thereby reducing an error, which will be further described below.

Figure 6:
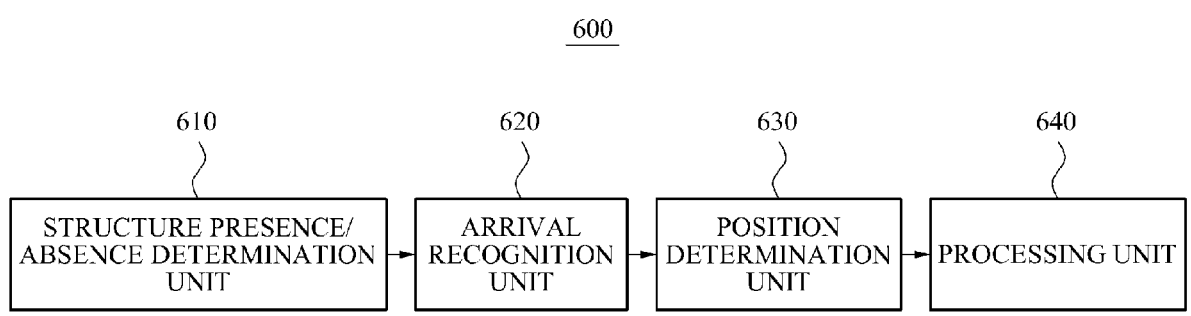
FIG. 6 is a block diagram illustrating an apparatus for predicting a radio-wave environment when a structure is present within a reception radius on an LOS between a transmission point and a reception point according to an embodiment.

FIG. 6 is a block diagram illustrating an apparatus 600 for predicting a radio-wave environment when a structure is present within a reception radius on an LOS between a transmission point and a reception point according to an embodiment.

Referring to FIG. 6, the apparatus 600 includes a structure presence/absence determination unit 610, an arrival recognition unit 620, a position determination unit 630, and a processing unit 640.

The structure presence/absence determination unit 610 may determine presence/absence of a structure within a reception circle on an LOS between a reception point and a transmission point.

The arrival recognition unit 620 may recognize, only when the structure is present within the reception circle, whether a ray emitted from a transmission unit of the ray tracing scheme passes through a reception circle of the reception point, that is, whether the ray arrives within the reception circle.

When the ray arrives within the reception circle, the position determination unit 630 may determine an arrival position where the ray arrives within the reception circle. The position may be determined using a vector of a radio-wave advancing direction and a normal vector of the reception circle.

The processing unit 640 may differently apply a size of the ray using the arrival position of the ray. Specifically, when a distance between the arrival position of the ray and a center of the reception circle is smaller than or equal to a predetermined value, the size of the ray may be applied as another predetermined value, and when the distance is greater than the predetermined value, the applied size of the ray may be reduced in inverse proportion to an increase in the distance. Accordingly, an error generated when predicting the radio-wave environment prediction due to a double counting of a signal being subjected to a reflection process and a diffraction process by a presence of the structure may be reduced.

Figure 7:
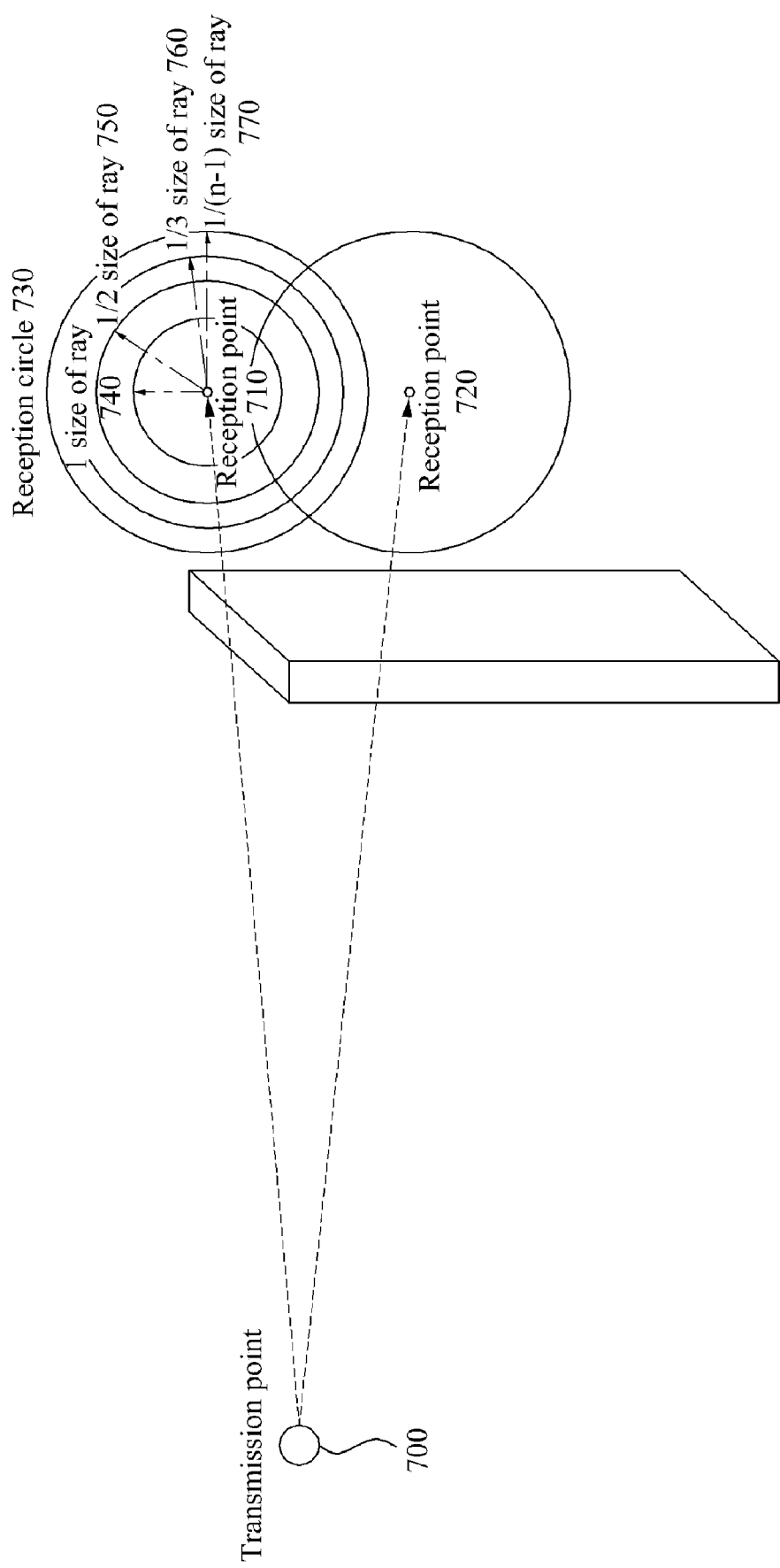
FIG. 7 is a diagram illustrating an example where rays are differently applied in a processing unit of the apparatus of FIG. 6 when a structure is present within a reception circle according to an embodiment.

FIG. 7 is a diagram illustrating an example where rays are differently applied in a to processing unit of the apparatus of FIG. 6 when a structure is present within a reception circle according to an embodiment.

Referring to FIG. 7, a ray emitted from a transmission point 700 may pass through a corner of a structure to arrive at a reception circle 730 or a reception point 710, which is not applied to a reception point 720 corresponding to a non-LOS. In this instance, when a structure is present within a reception circle, a size of the ray may be differently applied as a predetermined value depending on an arrival position where the ray arrives within the reception circle. In this instance, the predetermined value may be ½ the reception circle. The reason ½ the reception circle is the predetermined value is because, in order to cover overall directions of 360 degrees with respect to a reception point without creating a dead zone when some of a plurality of reception radiuses are overlapped, the respective reception radiuses need to be overlapped by ½ the reception circle. For example, in a case of two reception radiuses, a maximum overlapped area is ½ the reception radius, so that a signal of each of areas excluding the overlapped area may be '1' as a maximum. However, when referring to other variables, a value different from a value corresponding to ½ the reception circle may be the predetermined value for reducing an error generated in a double counting.

When a distance between the arrival position and a center of the reception circle is smaller than or equal to ½ the reception circle, the size of the ray may be applied as '1' a size of the ray 740, and when the distance is greater than ½ the reception circle, the size of the ray may be applied as '½' a size of the ray 750, '⅓' a size of the ray 760, and '1/(n−1)' a size of the ray 770, respectively, depending on the distance. Specifically, the predetermined value applied as the size of the ray may be reduced along with an increase in the distance.

Figure 8:
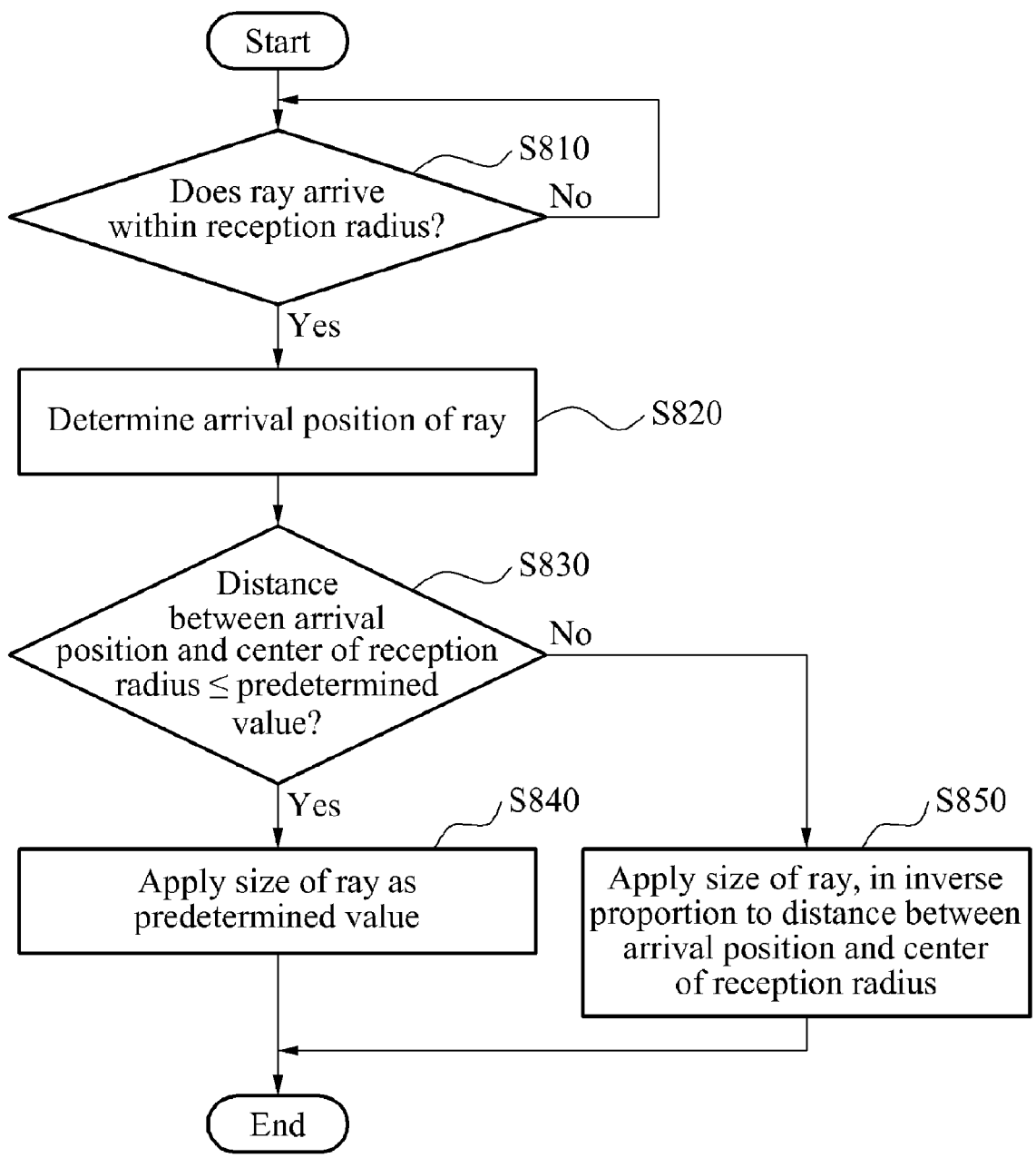
FIG. 8 is a flowchart illustrating a method of predicting a radio-wave environment according to an embodiment.

FIG. 8 is a flowchart illustrating a method of predicting a radio-wave environment according to an embodiment.

In operation S810, the method may recognize whether a ray emitted from a transmission unit of a ray tracing scheme arrives within a reception circle.

In operation S820, when the ray arrives within the reception circle, the method may determine an arrival position where the ray arrives within the reception circle. The arrival position may be calculated using a vector of a radio-wave advancing direction and a normal vector of the reception circle.

In operation S830, the method may determine whether a distance between the arrival position and a center of the reception circle is a predetermined value.

In operation S840, when the distance is smaller than or equal to the predetermined value, that is, in a case of a first reception area, the method may apply a size of the ray as another predetermined value. Conversely, in operation S850, when the distance is greater than the predetermined value, that is, in a case of the second reception area, the method may apply the size of the ray in inverse proportion to the distance. In this instance, the method may divide, into a plurality of areas, an area where the distance is greater than the predetermined value, that is, a second reception area. In the second reception area positioned on the same distance with respect to the center of the reception radius, the same size of the ray may be applied. In this instance, the size of the ray may be determined in an inverse proportion to the distance between the second reception area and the center of the reception radius.

For example, in a case where the predetermined value is ½ the reception circle, when the distance between the arrival position and the center of the reception circle is smaller than or equal to ½ the reception circle, that is, in the first reception area, the method may apply the size of the ray as '1', and when the distance is greater than ½ the reception circle, that is, the second reception area, the method may divide areas where the distance is greater than ½ the reception circle into a plurality of areas, and apply the size of the ray as ½, ⅓, and 1/(n−1), respectively, based on the distance.

Specifically, when the distance is greater than the predetermined value, the applied size of the ray may be reduced in inverse proportion to an increase in the distance between the arrival position and the reception circle, thereby reducing an error of a double counting.

Figure 9:
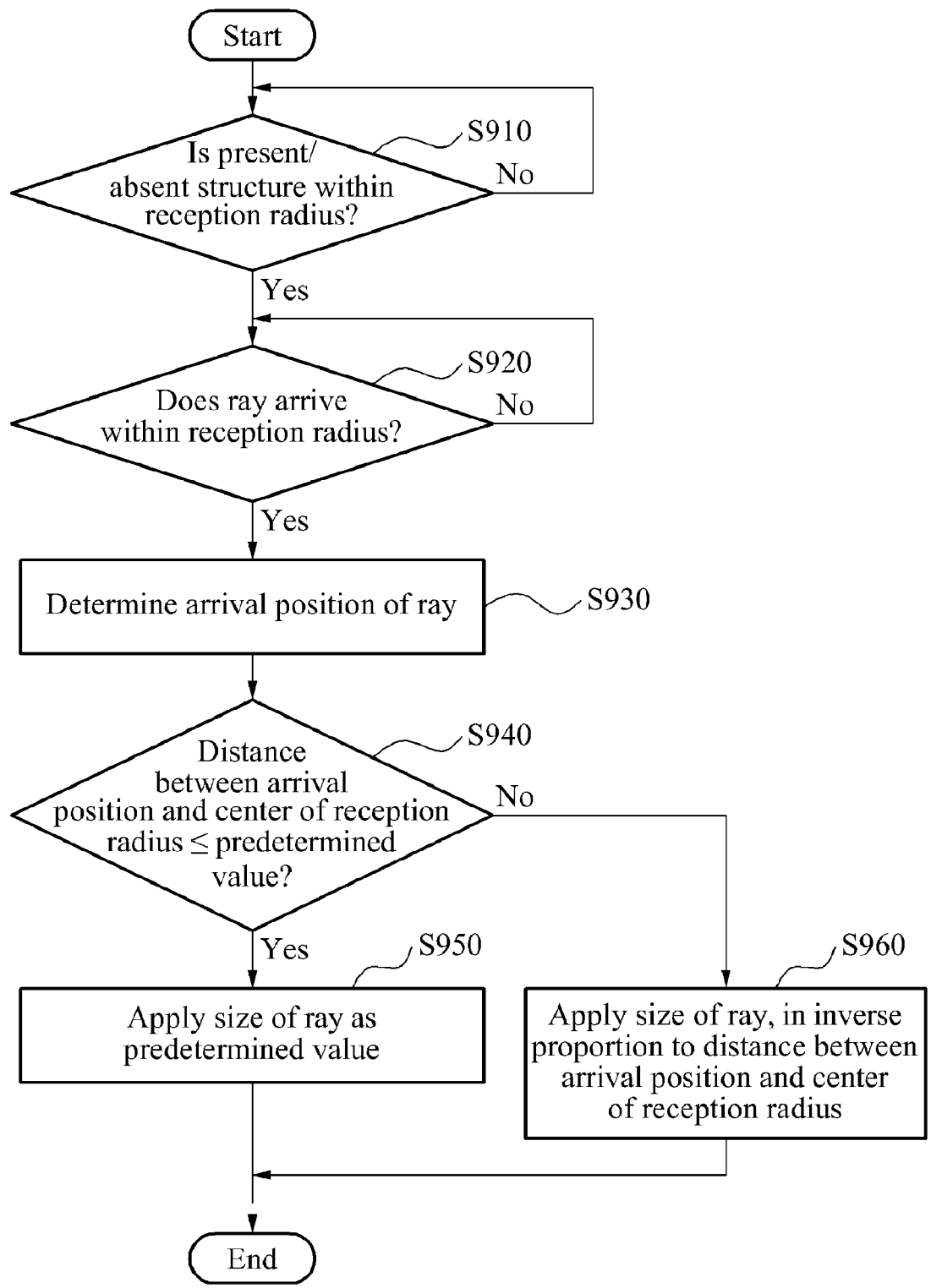
FIG. 9 is a flowchart illustrating a method of predicting a radio-wave environment when a structure is present within a reception radius according to an embodiment.

FIG. 9 is a flowchart illustrating a method of predicting a radio-wave environment when a structure is present within a reception circle according to an embodiment.

In operation S910, the method may determine whether a structure is present within a reception circle on an LOS between a transmission point and a reception point.

In operation S920, only when the structure is present within the reception circle may the method recognize whether a ray emitted form a transmission unit of a ray tracing scheme arrives within the reception circle.

In operation S930, when the ray arrives within the reception circle, the method may determine an arrival position where the ray arrives within the reception circle. The arrival position may be calculated using a vector of a radio-wave advancing direction and a normal vector of the reception circle.

In operation S940, the method may determine whether a distance between the arrival position and a center of the reception circle is greater than a predetermined value.

In operation S950, when the distance is smaller than or equal to the predetermined value, the method may apply a size of the ray as another predetermined value. Conversely, in operation S960, when the distance is greater than the predetermined value, the method may apply the size of the ray based on the distance, in inverse proportion to the distance.

Specifically, the applied size of the ray may be reduced along with an increase in the distance. This is not applied when a distance between the reception point and the structure is relatively large, however this has an effect to improve an error of reception accuracy generated due to a double counting.

Here, according to an embodiment, it may be possible to improve the reception radius by referring to the distance change between the transmission point and the reception point while preventing the double counting and the dead zone from occurring, and also requiring a relatively fewer calculations. In this instance, the improved reception radius may be denoted such that the reception radius is corrected by differently applying the size of the ray applied to the calculation of the reception radius, depending on the arrival position where the ray emitted from the transmission point arrives at within the reception radius.

In the method of predicting the radio-wave environment according to an embodiment, the various embodiments described with reference to FIGS. 3 to 7 will be directly applied, and thus further description thereof will be herein omitted.

As described above, according to an embodiment, there is provided the method of predicting the radio-wave environment, which may apply a size of a ray to correspond to a distance change between a reception point and a transmission point, so that an error due to a double counting or a dead zone may be prevented from occurring, when predicting the radio-wave environment using a ray tracing scheme.

Also, according to an embodiment, there is provided the method of predicting the radio-wave environment, which may differently apply the size of the ray depending on an arrival position where the ray arrives within the reception circle when a structure is present within the reception circle on an LOS between the transmission point and the reception point, thereby preventing errors of a ray tracing technology from occurring.

The methods according to the above-described embodiments may be recorded in non-transitory computer-readable storage media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape;

optical media such as CD ROM disks and DVDs; magneto-optical media such as optical disks; and hardware devices that are specially configured to store and perform program instructions, such as read-only memory (ROM), random access memory (RAM), flash memory, and the like. Examples of program to instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus of predicting a radio wave environment using a ray tracing scheme, the apparatus comprising:
an arrival recognition unit to determine whether a ray emitted from a transmission unit of the ray tracing scheme arrives within a reception radius;
a position determination unit to determine an arrival position where the ray arrives within the reception radius; and
a processing unit to correct the reception radius by differently applying a size of the ray according to the arrival position.

2. The apparatus of claim 1, wherein the processing unit applies, to a first reception area where a distance between the arrival position and a center of the reception radius is smaller than or equal to a predetermined value, the size of the ray as another predetermined value.

3. The apparatus of claim 2, wherein the predetermined value has a size of ½ the reception radius.

4. The apparatus of claim 1, wherein the processing unit applies, to a second reception area where a distance between the arrival position and a center of the reception radius is greater than a predetermined value, the size of the ray as a value obtained by adjusting the size of the ray in a reception radius contrast ratio of the second reception area.

5. The apparatus of claim 4, wherein the processing unit partitions the second reception area into a plurality of regions in accordance with the difference between the arrival position and the center of the reception radius, and applies the size of the ray within each of the partitioned regions, in inverse proportion to the distance between the arrival position and the center of the reception radius.

6. The apparatus of claim 1, further comprising:
a structure presence/absence determination unit to determine presence/absence of a structure within the reception radius on a Line of Sight (LOS) between the center of the reception radius and the transmission unit of the ray tracing scheme,
wherein the processing unit corrects the reception radius only when the structure is determined to be present.

7. A method of predicting a radio wave environment using a ray tracing scheme, the method comprising:
recognizing whether a ray emitted from a transmission unit of the ray tracing scheme arrives within a reception radius;
determining an arrival position where the ray arrives within the reception radius; and
correcting the reception radius by differently applying a size of the ray according to the arrival position.

8. The method of claim 7, wherein the correcting of the reception radius applies, to a first reception area where a distance between the arrival position and a center of the reception radius is smaller than or equal to a predetermined value, the size of the ray as another predetermined value.

9. The method of claim 8, wherein the predetermined value has a size of ½ the reception radius.

10. The method of claim 7, wherein the correcting of the reception radius applies, to a second reception area where a distance between the arrival position and a center of the reception radius is greater than a predetermined value, the size of the ray as a value obtained by adjusting the size of the ray in a reception radius contrast ratio of the second reception area.

11. The method of claim 10, wherein the correcting of the reception radius further comprises:
partitioning the second reception area into a plurality of regions in accordance with the difference between the arrival position and the center of the reception radius; and
applying the size of the ray within each of the partitioned regions, in inverse proportion to the distance between the arrival position and the center of the reception radius.

12. The method of claim 7, further comprising:
determining presence/absence of a structure within the reception radius on an LOS between the center of the reception radius and the transmission unit of the ray tracing scheme,
wherein the correcting of the reception radius corrects the reception radius only when the structure is determined as to be present.

* * * * *